United States Patent [19]

Rahman et al.

[11] Patent Number: 5,778,171
[45] Date of Patent: Jul. 7, 1998

[54] PROCESSOR INTERFACE CHIP FOR DUAL-MICROPROCESSOR PROCESSOR SYSTEM

[75] Inventors: Mizanur Mohammed Rahman. Cupertino; Fred C. Sabernick. Sunnyvale; Jeff A. Sprouse. Mountain View; Martin Jiri Grosz. Santa Clara; Peter Fu. Sunnyvale; Russell Mark Rector. Oakland, all of Calif.

[73] Assignee: Tandem Computers Incorporated. Cupertino, Calif.

[21] Appl. No.: 426,335

[22] Filed: Apr. 21, 1995

Related U.S. Application Data

[62] Division of Ser. No. 88,562, Jul. 6, 1993, Pat. No. 5,435,001.

[51] Int. Cl.$^6$ .............................. G06F 11/00; G06F 12/00
[52] U.S. Cl. ...................... 395/185.06; 711/202; 395/652
[58] Field of Search .................... 395/182.21, 185.06, 395/651, 652, 406, 410, 412, 183.04; 711/200, 202

[56] References Cited

U.S. PATENT DOCUMENTS

| | | |
|---|---|---|
| 4,219,881 | 8/1980 | Wilske . |
| 4,528,629 | 7/1985 | Breitling . |
| 4,761,732 | 8/1988 | Eldumiati et al. . |
| 4,797,817 | 1/1989 | Nguyen et al. . |
| 4,843,608 | 6/1989 | Fu et al. . |
| 5,269,006 | 12/1993 | Dohse et al. . |
| 5,276,823 | 1/1994 | Cutts, Jr. et al. . |
| 5,295,258 | 3/1994 | Jewett et al. . |
| 5,414,848 | 5/1995 | Sandage et al. ............ 395/650 |
| 5,473,775 | 12/1995 | Sakai et al. ............... 395/701 |

FOREIGN PATENT DOCUMENTS

| | | |
|---|---|---|
| 0 125 797 | 11/1984 | European Pat. Off. . |
| 0 293 720 | 12/1988 | European Pat. Off. . |
| 0 445 042 A2 | 9/1991 | European Pat. Off. . |
| 61-262845 A | 11/1986 | Japan . |
| 62-054349 A | 3/1987 | Japan . |
| 1159649 | 6/1989 | Japan ............... G06F 12/10 |
| 01223541 | 9/1989 | Japan . |
| WO 86/03608 | 6/1986 | WIPO ............... G06F 13/16 |
| WO 90/00284 | 1/1990 | WIPO . |

OTHER PUBLICATIONS

Patent Abstracts of Japan. Publication No. JP 2144635. Publication Date 4 Jun., 1990, 1 page.

David Jones. "Fehlertoleranz un Zuverlässigkeit in Mikroprozessor–Systemen Am Beispiel der Familie MC88000." 2087 Elektronik, 39 (1990), 23 Nov., No. 24, Munchen, DE, pp. 54–60.

IBM Technical Disclosure Bulletin, vol. 31, No. 9, Feb. 1989, "Improving Operational Performance of Cache Memories—Execution Tracing," pp. 83–84.

IBM Techinical Disclosure Bulletin, vol. 31, No. 3, Aug. 1988, "High Performance Microporcessor Memory System," pp. 303–306.

*Primary Examiner*—Albert Decady
*Attorney, Agent, or Firm*—Philip H. Albert; Townsend and Townsend and Crew LLP

[57] ABSTRACT

A processor interface chip and a maintenance diagnostic chip are provided coupled with two microprocessors designed to be run in tandem. The processor interface chip includes logic for interfacing between the microprocessors and a main memory, logic for pipelining multiple microprocessor requests between the microprocessors and main memory, logic for prefetching data before a microprocessor issues a read request, logic for allowing a boot to occur from code anywhere in physical memory without regard to the microprocessors' fixed memory location for boot code, and logic for intelligently limiting the flow of interrupt information over a processor bus between the microprocessors and the processor interface chip. The maintenance diagnostic chip includes logic to halt either of the microprocessors if an error is detected, and read out the state of the microprocessors and a secondary cache attached to the microprocessors, before the state of the microprocessors at the time of the fault changes to a different state which might hide evidence of the cause of the fault.

3 Claims, 8 Drawing Sheets

PROCESSOR INTERFACE CHIP FOR DUAL-MICROPROCESSOR PROCESSOR SYSTEM

This is a Division of application Ser. No. 08/088,562 filed Jul. 6, 1993 now U.S. Pat. No. 5,435,001.

BACKGROUND OF THE INVENTION

The present invention relates to the field of processor interface circuitry. More specifically, in one embodiment the invention provides an improved interface between a microprocessor, or a set of microprocessors, and other processor circuits.

In many cases, a microprocessor can be designed to run faster than external components with which it communicates. Unfortunately, the microprocessor often cannot proceed until a particular action is taken by the external device, and thus the performance of the processor system in which the microprocessor is used is adversely affected. One reason for this bottleneck is that communication between two circuits on the same integrated circuit, or chip, is generally faster than communication between two circuits separated by an inter-chip bus or other interface. Thus, one solution to the need for faster interaction with the microprocessor is to place more circuitry on the microprocessor chip, such as data and instruction caches. However, adding higher-level components on chip with the microprocessor make diagnosing errors much more difficult. This is because by the time an internal error is detected within the microprocessor and percolates out of the chip to a diagnostic system, the diagnostic system has much less time to investigate the cause of the error before the continued operation of the microprocessor changes the state of its internal circuits to the point where the state at the time of the error is no longer known. For example, if a data error occurs deep inside the microprocessor, but is detected and apparently fixed by logic inside the microprocessor before being output, external circuits may act on that data as being valid data thereby corrupting the processor system.

Another problem with processor systems is the microprocessor bus, over which most of the microprocessor requests and responses to those requests pass. The microprocessor bus carries write requests, along with the data to be written, read requests, read and write responses back to the microprocessor, and interrupt signals into the microprocessor. This traffic over the bus often limits the speed at which data can be accepted from, and provided to, the microprocessor.

From the above it is seen that an improved interface to a microprocessor is needed.

SUMMARY OF THE INVENTION

In one embodiment of a processor interface system according to the present invention, a processor interface chip and a maintenance diagnostic chip are provided, coupled with two microprocessors designed to be run in tandem. The processor interface chip includes logic for interfacing between the tandem microprocessors and a main memory, logic for pipelining multiple microprocessor requests between the microprocessors and main memory, logic for prefetching data before a microprocessor issues a read request for the prefetched data, logic for allowing a boot to occur from boot code anywhere in physical memory without regard to the microprocessors' fixed memory location for boot code, and logic for intelligently limiting the flow of interrupt information over a processor bus between the microprocessors and the processor interface chip. The maintenance diagnostic chip includes logic to halt either of the microprocessors if an error is detected, and read out the state of the microprocessors and a secondary cache attached to the microprocessors, before the state of the microprocessors at the time of the fault changes to a different state which might hide evidence of the cause of the fault.

A further understanding of the nature and advantages of the inventions herein may be realized by reference to the remaining portions of the specification and the attached drawings.

DESCRIPTION OF THE PREFERRED EMBODIMENTS

Figure 1:
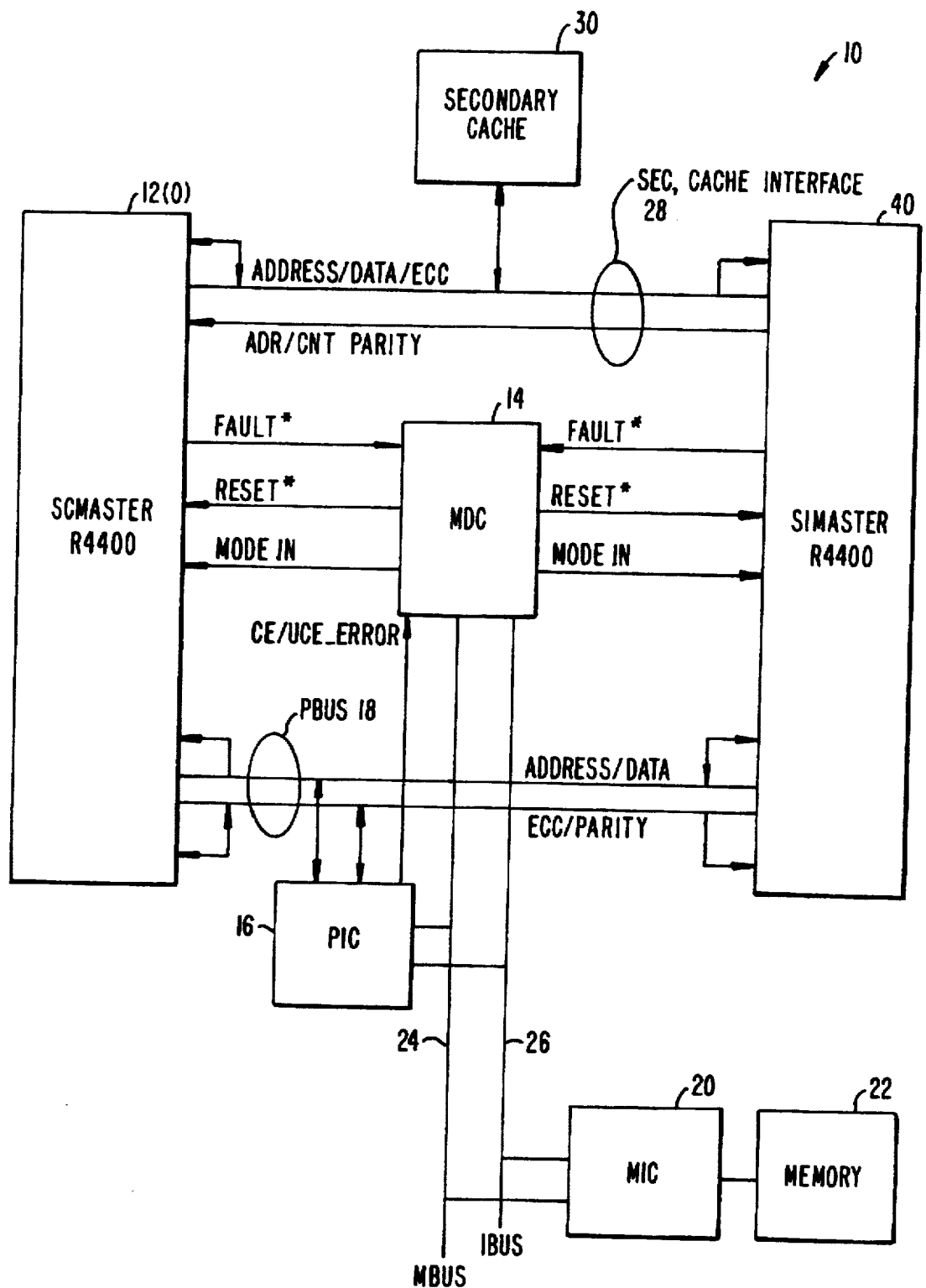
FIG. 1 is a block diagram showing an overview of a processor system according to the present invention, including two microprocessors, the processor interface chip (PIC) and the maintenance diagnostic chip (MDC)

FIG. 1 is an overview of a processor system 10 according to the present invention. Processor system 10, in one preferred embodiment, comprises two microprocessors, and several special purpose chips on a processor board, however other configurations are possible, such as including several circuits shown on one chip or providing several chips for individual functions. Processor system 10 is shown in FIG. 1 with two microprocessors 12(0,1), a Maintenance and Diagnostic Chip (MDC) 14, a Processor Interface Chip (PIC) 16, a Memory Interface Chip (MIC) 20, a main memory 22, a secondary cache 30. Other components which are not shown may be included.

Several busses interconnecting components are also provided. A processor bus (Pbus) 18 couples PIC 16 and the microprocessors 12(0,1); a maintenance bus (Mbus) 24 couples MDC 14 to PIC 16 and MIC 20 and carries diagnostic commands and data to and from MDC 14; an internal bus (Ibus) 26 couples PIC 16 to MDC 14 and MIC 20; and a secondary cache bus 28 couples microprocessors 12(0,1) to secondary cache 30.

For reliability, several busses use information lines and check lines, where the information lines carry the independent signals for which the bus exists (such as data, instructions, addresses, control signals, etc.), and the check lines carry check signals which are a function of the values on the information lines and a check function such as check sum, parity, or other error-correcting code (ECC) functions. For example, Ibus 26 comprises, in part, 32 signal lines and four parity lines, where each of the parity lines carries an even parity check of eight of the 32 information signal lines. In FIG. 1, some busses are not shown with check lines separated from information lines.

Microprocessors 12 can operate in a "complete master" mode, where one microprocessor controls the information lines and the check lines of both Pbus 18 and SC bus 28, or they can operate in a "lock-step", or a "partial master", mode where each microprocessor 12 controls on bus of Pbus 18 and SC bus 28. For reliability, both microprocessors 12 read the busses and execute the same instructions, but only one, the master of a bus, drives the information lines of the bus, while the other microprocessor 12 monitors the information lines and compares the values on those lines with what it would have driven on those lines (its "potential" output) if it were the master for that bus. If the non-master microprocessor disagrees with what is on the information lines of the bus, it triggers an "output miscompare" fault, which is explained in connection with FIG. 2. For further reliability, the master of a bus does not drive the bus check lines, the non-master does. This way, if the microprocessors are operating normally, but get out of step with each other, other devices on the bus will notice the error, as the check lines will not likely be correct.

FIG. 1 shows one microprocessor, 12(0), as being the master of SC bus 28 and is labelled "SC Master" (Secondary Cache Master), while the other microprocessor, 12(1), is the master of Pbus 18, and is labelled "SI Master" (System Interface Master—Pbus 18 is the "system interface" in this case). Thus, when operating in lock-step, SC Master 12(0) drives the information lines of SC bus 28 (Address/Data/ECC) and monitors the check lines of SC bus 28 (Adr/Cnt parity—address and control line parity), while SI Master 12(1) drives the check lines and monitors the information lines of SC bus 28. Conversely, SI master 12(1) drives the information lines of Pbus 18 (address/data) and monitors the check lines of Pbus 18 (ECC/parity), while SC Master 12(0) drives the check lines and monitors the information lines of Pbus 18.

In some embodiments, one microprocessor might be both the SC Master and the SI Master, in other words, a "complete master", with the other microprocessor is a "complete listener", duplicating the operation of the complete master, but not driving any lines except possibly its fault line, which it does not share with the complete master. While the ECC lines of SC bus 28 are actually check lines, they are grouped with the information lines. This is because the ECC lines are used by secondary cache 30 to do error checking there, and if all the lines into secondary cache 30 come from the same microprocessor, the secondary cache can run faster without worrying about slight variations in timing which might occur between the two microprocessors 12(0,1), thus causing the address and data to arrive at the secondary cache offset in time with the ECC signals. Such timing variations might be caused by process variations in creating the microprocessors.

In a preferred embodiment, microprocessors 12(0,1) are R4400 microprocessors manufactured by the MTI division of Silicon Graphics, Inc.

In addition to the busses (Ibus, Pbus, SC bus, Mbus), other signal lines exist between various components. An error signal line from PIC 16 to MDC 14 carries a CE/UCE error signal which indicates that the PIC has encountered a correctable or uncorrectable error on the Pbus. If check values on the check lines of the Pbus do not correctly reflect the check function for the information values on the information lines of the Pbus, then the PIC asserts the CE/UCE error signal.

Three lines, FAULT*, RESET*, and MODEIN are provided between each microprocessor 12 and the MDC. The FAULT* line is driven low by the microprocessor when it detects a fault. The RESET* and MODEIN lines are driven by the MDC 14. The RESET* signal is an active low signal which holds the microprocessor in a reset state when the signal is low, and the MODEIN signal controls a mode of the microprocessor. Where the RESET* signal is being asserted (held low by MDC 14), the MODEIN signal controls the meaning of signals on the FAULT* line.

Figure 2:
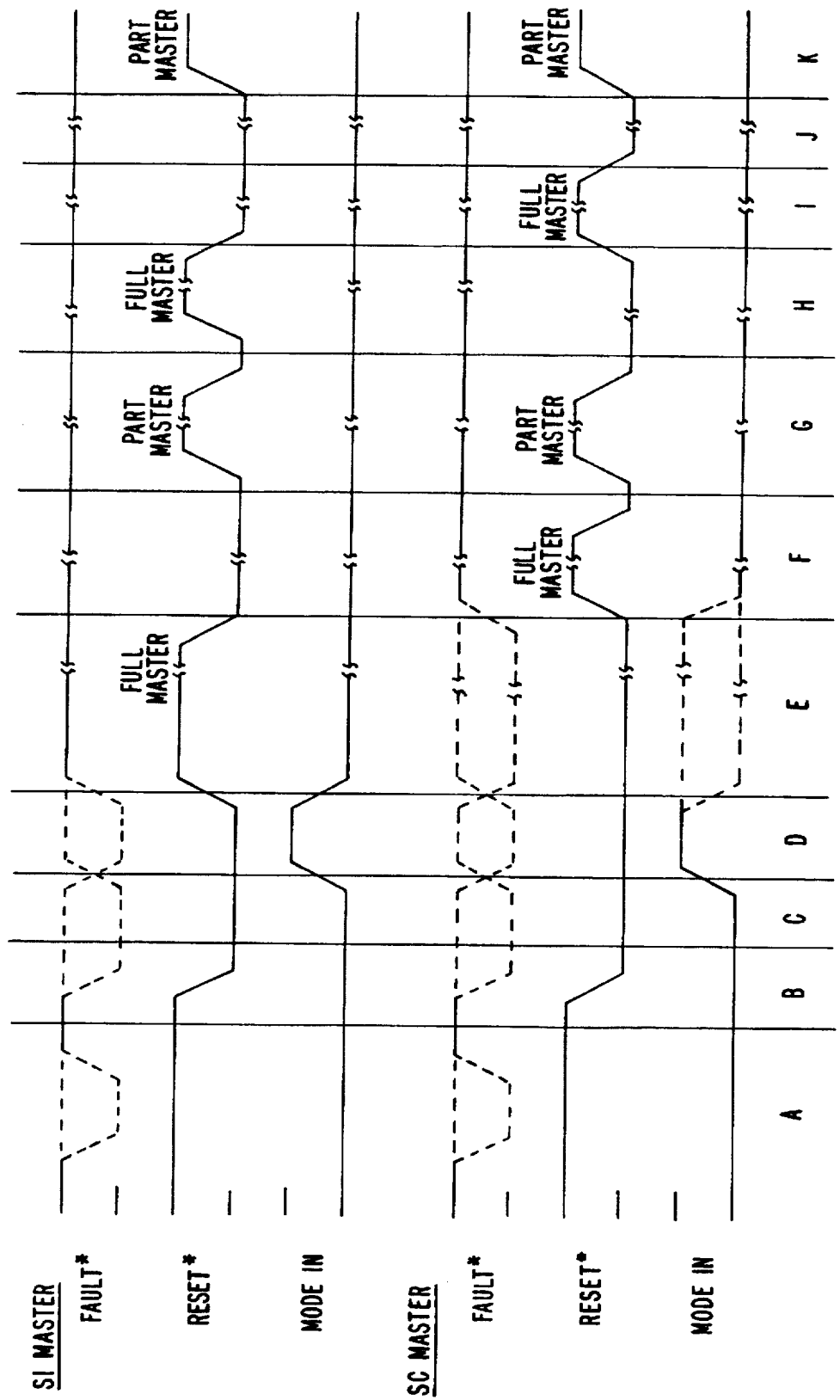
FIG. 2 is a timing diagram illustrating the interaction between the microprocessors and the maintenance diagnostic chip following a fault.

FIG. 2 shows the interaction of the FAULT*, RESET*, and MODEIN signals in more detail. FIG. 2 is a timing chart, which is divided into periods labelled A–K, which are not equal spans of time, but which differentiate different periods of activity on these signal lines. These periods are briefly described in Table 1.

TABLE 1

Processing Periods Following a Fault

| Per. | Description |
|---|---|
| A | SI Master and/or SC Master asserts their FAULT* line, which is detected by the MDC. |
| B | MDC asserts RESET* signal for both microprocessors. |
| C | MDC continues to assert both RESET* signals (i.e., holding the RESET* lines low) and asserts both MODEIN signals (by driving the MODEIN lines high), in which state the FAULT* lines of each microprocessor indicate (by going low) whether that microprocessor believes an output miscompare was the first fault to trigger the fault. |
| D | MDC continues to assert both RESET* signals and drives both MODEIN lines high, in which state the FAULT* lines of each microprocessor indicate (by going low) whether that microprocessor believes an input fault occurred. |
| E | MDC releases the RESET* signal for the SI Master only, at which point the SI Master becomes a complete master of SC bus 28, Pbus 18, and the check lines for both busses. |
| F | MDC reasserts the RESET* signal for the SI Master and deasserts the RESET* signal for the SC Master, at which point the SC Master becomes a complete master. At the end of this period, MDC reasserts the RESET* signal for the SC Master. |
| G | MDC deasserts the RESET* signal for both microprocessors, and they both run as partial masters. At the end of this period, MDC reasserts both RESET* signals. |
| H | MDC deasserts the RESET* signal for the SI Master, and holds (continues to assert) the RESET* signal for the SC Master. In this period, the SI Master is a complete master. |
| I | MDC reasserts the RESET* signal for the SI Master and deasserts the RESET* signal for the SC Master. In this period, the SC Master is a complete master. |
| J | MDC reasserts both RESET* signals for some finite time period. |
| K | MDC deasserts both RESET* signals, and the microprocessors come up as partial masters. |

The timing chart (period A) begins with either the SC Master (shown as 12(0) in FIG. 1) or the SI Master (shown as 12(1) in FIG. 1) detecting a fault, and asserting its FAULT* line by driving it low. This signal is picked up by MDC 14. For some errors, such as where the PIC drives Pbus 18 with incorrect parity, both microprocessors 12 might assert their separate fault lines. For other errors, only one microprocessor 12 might detect the error.

In any case, when a fault occurs, MDC 14 must quickly determine the state of microprocessors 12. The state of microprocessors 12 is the values of its internal registers and flags. For complete diagnostics, MDC 14 must also obtain the contents of the primary caches of each microprocessor 12 and the contents of the shared secondary cache 30 (see FIG. 1). Where microprocessors are used in which instructions and data are cached separately, the primary caches include a primary instruction cache and a primary data cache.

Once the MDC receives the FAULT* signal, the MDC asserts the RESET* line of both microprocessors (period B). When the RESET* signal is asserted, the microprocessor goes into a state where all of its outputs are tri-state outputs except the FAULT* line. This allows other lock-step microprocessors to completely control the busses without interference. Microprocessors 12 contain internal logic in which a bit can be set and remembered after a reset. This bit indicates whether microprocessor 12 is an SI Master or an SC Master when in the partial master mode. Each time microprocessor 12 is reset and the reset is held for at least some predetermined amount of time, the master mode of the microprocessor toggles between the complete master mode and the partial master mode.

In addition to holding microprocessors 12 in a reset state, the MDC also sends a hold signal over Mbus 24 to preserve the state of the devices coupled to Ibus 26.

While in a reset mode, logic within microprocessor 12 provides further fault indications on the FAULT* line which depend on the state of the MODEIN line (periods B,C). When the MODEIN line is low, the FAULT* line is low (logical 0) if an output miscompare first triggered the fault which resulted in the initial FAULT* pulse. As explained above, an output miscompare fault is expected from one microprocessor when a line being driven by the other microprocessor is being driven to a value different than the one microprocessor's potential output. Unless the output logic is faulty, a microprocessor cannot logically detect an output miscompare on the lines it is driving. Since each microprocessor 12 is a master for some lines, the output miscompare indications will indicate the likely lines on which the miscompare occurred, on either SC bus 28 or Pbus 18. The FAULT* line will be driven low (logical 0) by the microprocessor detecting the error if an output miscompare was detected.

Next, in period C, the input fault history bit from each microprocessor 12 is read from the FAULT* lines. When the MDC, which keeps the RESET* lines low, drives the MODEIN lines high, microprocessors 12 output an input fault history bit on their FAULT* lines, driving the lines low to indicate an input fault. The input fault history bit does not indicate that the input fault was the first fault to occur, but just that an input fault did occur at some time since the input fault bit was reset.

After the fault is detected by the MDC, the MDC loads diagnostic code into memory 22 at the boot location for the microprocessors. The boot location is the first instruction location read by the microprocessor upon reset (although, as explained later, this address might be relocated to a physical memory location by boot address relocator 194).

Once the diagnostic code is loaded, the RESET* signal is deasserted on microprocessor 12(1) (the SI Master in a partial master mode), and it runs as a complete master, as explained above. The diagnostic code causes microprocessor 12(1) to dump its state and the contents of its primary cache (period E). The diagnostic code is usually written such that the primary cache is not used while running this code, so that it can be read without being destroyed first.

Since the RESET* line on microprocessor 12(0) is still asserted, the output lines of that microprocessor are tri-stated. This allows microprocessor 12(1) to run the diagnostic code which causes it to make the dump without interference by microprocessor 12(0). The dumped data can then be picked up by the PIC and passed to MIC 20 to store in memory 22 for later analysis. Of course, given that a fault has occurred, either of the microprocessors 12 might not behave properly and might interfere with the collection of diagnostic data.

At the end of period E, the RESET* line on microprocessor 12(1) is again asserted. Starting in period F, the RESET* line for microprocessor 12(0) is deasserted and it begins to run diagnostic code to dump its state and primary cache. Once both microprocessors 12 have dumped their state and primary caches, secondary cache 30 needs to be dumped.

Since MDC 14 does not connect directly to SC bus 28, secondary cache 30 must be dumped through one of the microprocessors 12. MDC 14 could connect directly to SC bus 28 for this purpose, but connecting another device to SC bus 28 would slow its response time, so MDC 14 reads secondary cache 30 via a microprocessor 12. Until the problem causing the fault is diagnosed, it is unknown which microprocessor 12 is faulty, if either, so secondary cache 30 is read out using both microprocessors operating in lock-step, and then using each microprocessor separately, to provide three copies of the secondary cache for the analysis.

If an output miscompare occurs while secondary cache 30 is being read out of the lock-stepped microprocessors 12(0, 1), it is ignored. Since each microprocessor 12 is set to come up in a partial master mode when its reset line is released, secondary cache 30 is first read in the lock-step (two partial masters) mode (period G). Note that in order for the SC Master to be a partial master, the SC Master must have been reset for some finite time between periods F and G, as is shown in FIG. 2.

In period G, both microprocessors 12 run the same code which instructs them to dump the contents of secondary cache 30 to PIC 16, which passes it to MIC 20 for storage in memory 22. If an output miscompare occurs during this dump, a FAULT* line might be asserted, but it is ignored by the MDC (although it may be noted and logged by the MDC). Of course, the diagnostic code is usually written such that the secondary cache is not used while running this code.

In period H, microprocessor 12(1), as a complete master, dumps the contents of secondary cache 30, and in period I, microprocessor 12(0), as a complete master, dumps the contents of secondary cache 30.

Period J illustrates the finite time period which is required for the reset line to toggle the partial/complete master mode in microprocessor 12(0). Once the states and the primary caches of each microprocessor 12 and secondary cache 30 have been dumped, MDC 14 can proceed to analyze the dump, or could cold-reset microprocessors 12 by deasserting the RESET* lines (period K).

Figure 3:
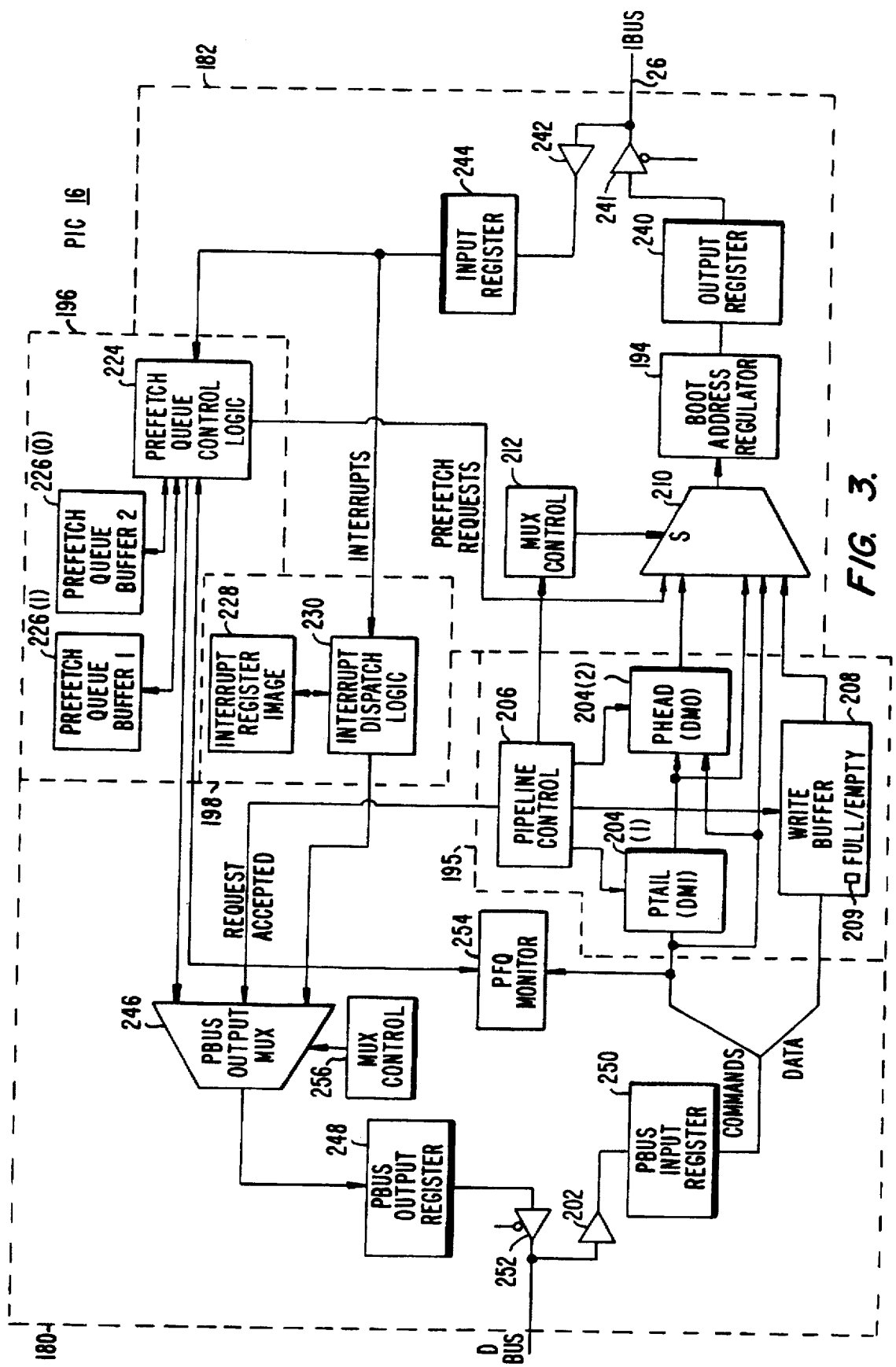
FIG. 3 is a block diagram showing the PIC in further detail, including a boot address translation circuit, a prefetch queue, an interrupt filter and a request pipeline.

FIG. 3 shows PIC 16 in greater detail. The PIC contains many elements not shown, and is roughly divided into a Pbus interface section 180, an Ibus interface section 182, a request pipeline 195, a prefetch queue 196, and an interrupt filter 198.

Pbus interface section 180 contains logic for reading data from Pbus 18 and for outputting data from several other components of PIC 16 onto Pbus 18. The components of Pbus interface section 180 shown in FIG. 3 are a multi-bit input driver 202 coupled to Pbus 18, a Pbus input register 250 coupled to input driver 202, a prefetch queue monitor 254 coupled between a command path output by input register 250 and prefetch queue 196, a Pbus output multiplexer 246 with a select input received from a multiplexer controller 256 and an output coupled to a Pbus output register 248, which in turn is coupled to an input of a multi-bit output driver 252. The output of register 250 is split into a command path and a write data path, with the commands going to prefetch queue monitor 254 and request pipeline 195, and the write data going to a write buffer 208 of request pipeline 195.

Ibus interface section 182 contains logic for reading data from Ibus 26 and for outputting data from several other components of PIC 16 onto Ibus 26. The components of Ibus interface section 182 shown in FIG. 3 are a second multi-bit input driver 242 connected to Ibus 26, an Ibus input register 244 coupled to input driver 242, an Ibus output multiplexer 210 with a select input received from a second multiplexer controller 212 and an output connected to a boot address relocator 194, which outputs to an Ibus output register 240, which is in turn connected to an input of a second multi-bit output driver 214. The output of register 244 is split into two outputs, with one output for interrupts going to interrupt filter 198 and the other output for memory read responses going to prefetch queue 196.

Request pipeline 195 will now be described in further detail with reference to FIG. 3. Following the description of request pipeline 195, prefetch queue 196 is described with reference to FIG. 4 and interrupt filter 198 is described with reference to FIG. 7.

Request pipeline 195 comprises a pipeline tail register PTAIL (DMI) 204(1), a pipeline head register PHEAD (DMO) 204(2), a pipeline controller 206, and a write buffer 208. Write buffer 208 includes a full/empty flag 209 for indicating whether the write buffer is full or empty. Pipeline controller 206 also maintains a register (not shown) indicating how full or empty write buffer 208 is, as well as a programmable threshold (also not shown) which can be compared to the register for deciding whether to send the incoming write request to Ibus 26 or to wait for write buffer 208 to fill further.

The command portion of a microprocessor request, such as an indication that the request is a memory read request and an indication of the address to be read, is either stored in the pipeline tail, the pipeline head, or is passed directly to multiplexer 210 and onto Ibus 26. In some cases, a memory read request might not reach the request pipeline, but will be routed to the prefetch queue 196. This occurs when the data to be read by the microprocessor is already present in the prefetch queue. This condition is detected by comparing the address portion of the read request with the address tags stored for the buffers of the prefetch queue 196. If the read request does enter request pipeline 195, however, it can be passed directly through request pipeline 195, or stored in either PTAIL or PHEAD. If both PTAIL and PHEAD are empty and Ibus 26 is free, the read request passes directly to multiplexer 210.

If Ibus 26 is busy, the read request is placed in PHEAD and pipeline controller 206 returns a request acceptance to the microprocessor over Pbus 18, so that the microprocessor can continue. If PHEAD is occupied, the read request is placed in PTAIL, and moved along to PHEAD when PHEAD is free; again, pipeline controller 206 returns a request acceptance to the microprocessor. If PTAIL is also occupied, then the read request is held in input register 250, and pipeline controller does not send back a request acceptance. Until pipeline controller 206 sends back a request acceptance (when the read request is finally loaded into PTAIL or PHEAD, or sent to Ibus 26), the microprocessor avoids using Pbus 18 to send more requests.

Write requests are placed in PTAIL 204(1) and the write data is collected off Pbus 18 into write buffer 208. When write buffer 208 is full, full/empty flag 209 is set to "full". When the threshold amount of data is loaded into write buffer 208, pipeline controller 206 moves the write request from PTAIL to PHEAD. If Ibus 26 is available, the write request then moves there, and when the write request and accompanying data is sent over the bus, the full/empty flag is set to "empty". In the embodiment shown in FIG. 3, only one write request can be in the request pipeline at one time, but other embodiments, with different constraints as to bus performance and allocated chip area might have multiple write buffers or more than two pipeline stages 204.

In order to avoid sending obsolete data to the microprocessor, prefetch queue monitor 254 monitors the write requests, and signals prefetch queue 196 to invalidate any data the prefetch queue may have already retrieved from the memory locations which are to be written by the write requests. A dotted line connecting pipeline control 206 and multiplexer controller 212 is used to indicate that pipeline controller 206 signals to multiplexer controller 212 which, if any, output of request pipeline 195 is to be output onto Ibus 26.

Because Ibus 26 is only accessed when a write request and its write data are complete in PIC 16, Ibus 26 is used more efficiently. Several bus cycles of Pbus 18 are needed to get all the write data, so Ibus 26 is not used until write buffer 208 is at least filled to the programmable threshold stored in pipeline controller 206.

Figure 4:
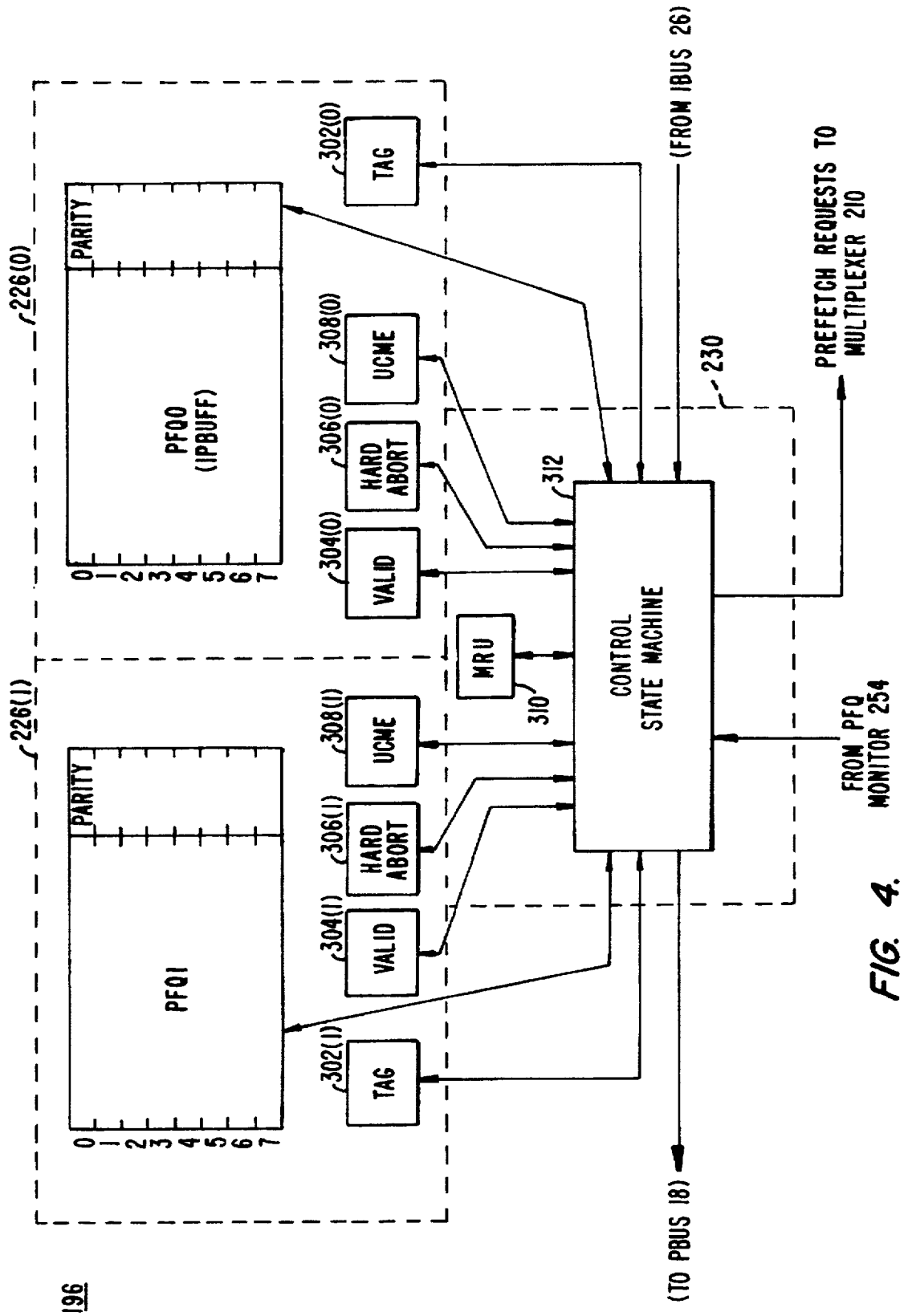
FIG. 4 is a block diagram showing the prefetch queue in greater detail.

FIG. 4 shows prefetch queue 196 in greater detail. Prefetch queue 196 comprises a control state machine 312, a most recently used register (MRU) 310, and two buffers (PFQ0, PFQ1) 226(0,1). MRU 310 points to the most recently used buffer 226. Each buffer includes storage for eight data words and associated parity bits, an address tag register 302, a validity flag 304, a hard abort flag 306, and an uncorrectable memory error (UCME) flag 308. Control state machine 312 is coupled to Ibus 26 and Pbus 18 through bus interface registers, and is coupled to read and write the storage areas and various flags of each buffer 226. Control state machine 312 also receives signals from prefetch queue monitor 254 which are used to provide prefetched data to Pbus 18 and to invalidate data which has been written after being read into a buffer 226. Control state machine 312 includes an output over which memory read requests are made via multiplexer 210.

Prefetch queue 196 operates as follows. For non-prefetch operations, PFQ0 is used as an Ibus buffer. For prefetch operations, control state machine 312 is made aware of a read address of a read request, either through monitor 254 or from the data coming from Ibus 26. Control state machine 312 then makes a request for the data from the addresses following the block which was actually requested, or makes a single request over Ibus 26 for twice as much data as was requested in the read request. The block of data which as actually requested is sent along to the microprocessor over Pbus 18, and the other half is stored in a prefetch queue buffer 226 until requested.

Suppose MRU 310 indicated that PFQ1 was most recently used, and that both validity flags 304(0,1) were reset. When a read request is sent to PIC 16, the read request cannot filled by the prefetch queue, so the request is put on Ibus 26 by request pipeline 195. A typical read request asks for eight words, but to fill the prefetch queue, the request on Ibus 26 asks for sixteen words. If the sixteen word request would cross a DRAM (dynamic random access memory) page boundary, the request is sent out as two eight-word requests. When the 16 words are returned, eight are sent on to fill the request, and the other eight words are stored in PFQO (the oldest buffer). MRU 310 is toggled to point to PFQ1, tag register 302(0) is updated with the address of the latter eight words stored in PFQ0, and validity flag 304(0) is set.

If, during the read of the first eight words, a hard abort error or UCME occurred, an indication of that condition is passed on to the microprocessor. However, if the error occurred in the latter eight words, the indication is not passed on to the microprocessor until the microprocessor actually requests the data which causes the error. If a hard abort is caused by reading the latter eight words, the hard abort flag 306(0) is set, and if an UCME occurred reading the latter eight words, UCME flag 308(0) is set.

When PFQ monitor 254 indicates that a read request was issued for an address matching one of the tag registers 302(0,1), that request is filled from the prefetch queue, and the buffer 226 which filled the request is marked invalid by resetting its validity flag 304. Anytime there is an invalid buffer 226, another eight words could be fetched, so that prefetch queue 196 is rarely a bottleneck for data flow. When a write request is sent to request pipeline 195, PFQ monitor 254 supplies the write address to control state machine 312, which compares it to tag registers 302(0,1). If the write address matches either tag register, control state machine 312 resets the validity flag 304 for the buffer 226 associated with the matching tag register.

Figure 5:
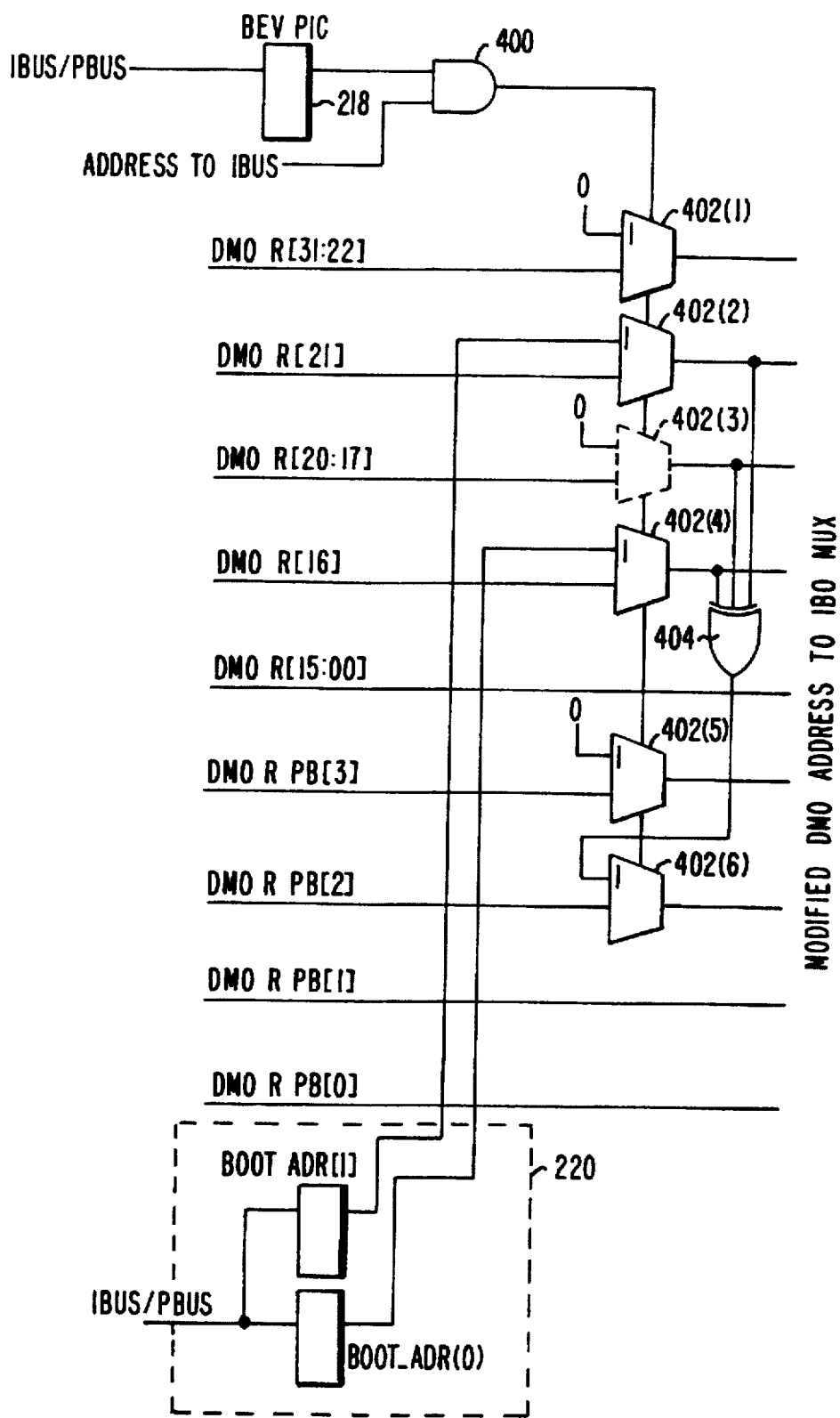
FIG. 5 is a block diagram showing the boot address translation circuit in greater detail.

FIG. 5 shows boot address relocator 194 in greater detail. In FIG. 5, boot address relocator 194 comprises a boot exception vector indicator register (BEV_PIC) 218 for storing a bit indicating whether or not boot address relocation is to be done, two-bit boot address register 220, six two-input multiplexers 402(1..6), an AND gate 400 and an exclusive OR (XOR) gate 404. An address comprises 32 bits and four bits of parity, one parity bit for each byte (8 bits) of address. The parity bits are even parity, so that dmo_r_pb[3] is an XOR of dmo_r[31:24], dmo_r_pb[2] is an XOR of dmo_r[23:16], and so on.

Register 220 and BEV_PIC 218 can be set in a number of ways, such as being controllable by MDC 14. One way MDC 14 inserts values into registers is by inserting the desired values into scan data and running a scan on the registers, reading out their current content while inserting new content.

Boot address relocator 194 has a bus input, a bus output, and an input to indicate whether the content of the bus is an address which will be placed on Ibus 26. If the content of the bus is not an address which will be placed on Ibus 26, the data is passed through boot address relocator without modification. AND gate 400 has two inputs, one from BEV_PIC 218 and the other from an input which indicates if the input is an address for Ibus 26. If both are true, then AND gate 400 outputs a logical 1 (SELECT=1) to the select inputs of multiplexers 402(1 . . . 6), which causes the relocation of the address on the bus. Otherwise, if AND gate 400 outputs a logical 0 (SELECT=0), the data on the bus passes through boot address relocator 194 unchanged.

Table 2 shows the logic of the multiplexers and its effect on the bits of the address lines.

TABLE 2

Boot Relocation Addressing

| Line(s) | SELECT=0 | SELECT=1 |
|---|---|---|
| 31:24 | dmo_a[31:24] | 0 |
| 23:22 | dmo_r[23:22] | 0 |
| 21 | dmo_r[21] | boot_adr[1] |
| 20:17 | dmo_r[20:17] | 0 |
| 16 | dmo_r[16] | boot_adr[0] |
| 15:08 | dmo_r[15:08] | dmo_r[15:08] |
| 07:00 | dmo_r[07:00] | dmo_r[07:00] |
| parity 3 | xor(dmo_r[31:24]) | 0 |
| parity 2 | xor(dmo_r[23:16]) | xor(dmo_r[21:16]) |
| parity 1 | xor(dmo_r[15:08]) | xor(dmo_r[15:08]) |
| parity 0 | xor(dmo_r[07:00]) | xor(dmo_r[07:00]) |

Figure 6:
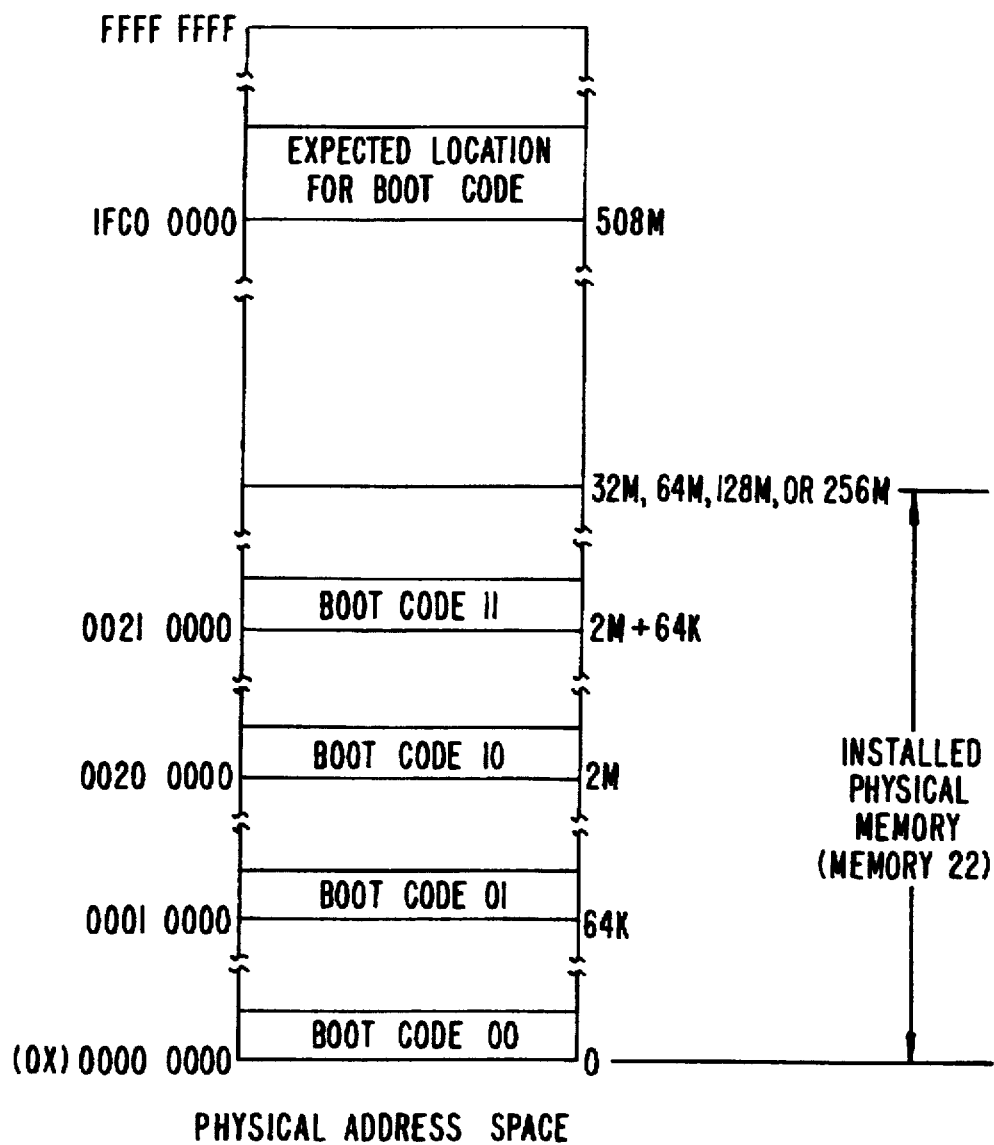
FIG. 6 is a memory map of a physical memory addressed by the microprocessors.

FIG. 6 shows a memory map of 32-bit addresses from 0x00000000 to 0xFFFFFFFF which illustrates the effect of boot address relocation. In one embodiment of a processor system, the operating system expects physical memory at the low addresses starting at 0x00000000, and spanning 32, 64, 128, or 256 megabytes (MB). However, microprocessor 12 expects to find boot code at 0x1FC00000. Both these needs can be met by either using a memory of at least 508 Mb to span the space from 0x00000000 to 0x1FC00000, or by adding a small memory at 0x1FC00000 which contains code including a jump to a location in the physical memory. While microprocessor 12 is running, it can perform virtual memory address translations with its internal translation look-aside buffer (TLB), but following a reset it has not yet configured itself for virtual memory operations. The boot code assists in this setup, so it must be located in, or relocated to, an address where microprocessor 12 expects it.

Four sections of physical address space (labelled 00, 01, 10, and 11) are available for boot code. Since these sections are all located within the first 4 MB of memory, they are all located in the installed physical memory of the embodiment discussed above. Boot address relocator 194 relocates addresses to one of these four sections, where the particular one of the four sections is determined by the contents of the boot address register 220, which is labelled as BOOT_ADR [1:0].

FIG. 5 shows multiplexer 402(3) in a dotted outline to indicate that it is not really needed since bits 20:17 are all zeroes in a boot address in the above example anyway. In this case, multiplexer 402(3) can be eliminated to save chip real estate.

Figure 7:
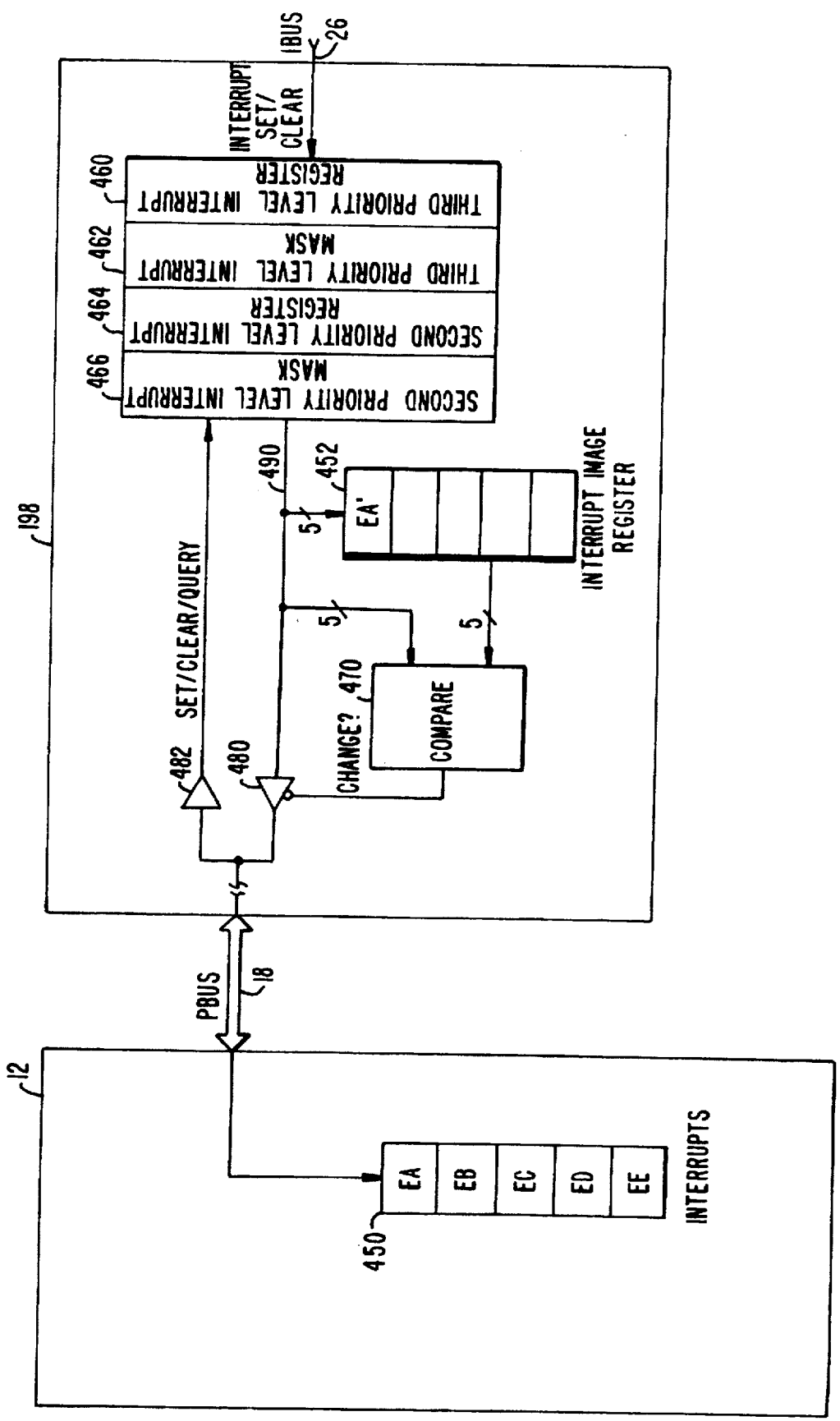
FIG. 7 is a block diagram showing the interrupt filter in greater detail.

FIG. 7 shows the details of interrupt filter 198, which includes an interrupt image register 452, a third priority level interrupt register 460, a third priority level interrupt mask 462, a second priority level interrupt register 464, a second priority level interrupt mask 466, a multi-line comparator 470, an output driver 480, and an input driver 482. FIG. 7 also shows an interrupt register 450 within microprocessor 12.

An interrupt input path is shown, where an interrupt propagates from Ibus 26, and in order, through register 460, mask 462, register 464, mask 466, and onto internal bus 490. Five lines of internal bus 490 are provided to interrupt image register 452, which has a five-line output to comparator 470. A comparator output of comparator 470 is coupled to an output enable of driver 480. The input to driver 480 is internal bus 490. The output of driver 482 is provided to the registers and masks, while the input of driver 482 and the output of driver 480 are coupled to Pbus 18 through Pbus interface section 180 (not shown; see FIG. 3). Interrupt register 450 of microprocessor 12 is coupled to the Pbus as well.

In operation, interrupts from Ibus 26 are filtered so that the only interrupts which reach microprocessor 12 are interrupts which would alter the contents of interrupt register 450, however, microprocessor 12 is free to query or change any interrupt register or mask in interrupt filter 198.

Figure 8:
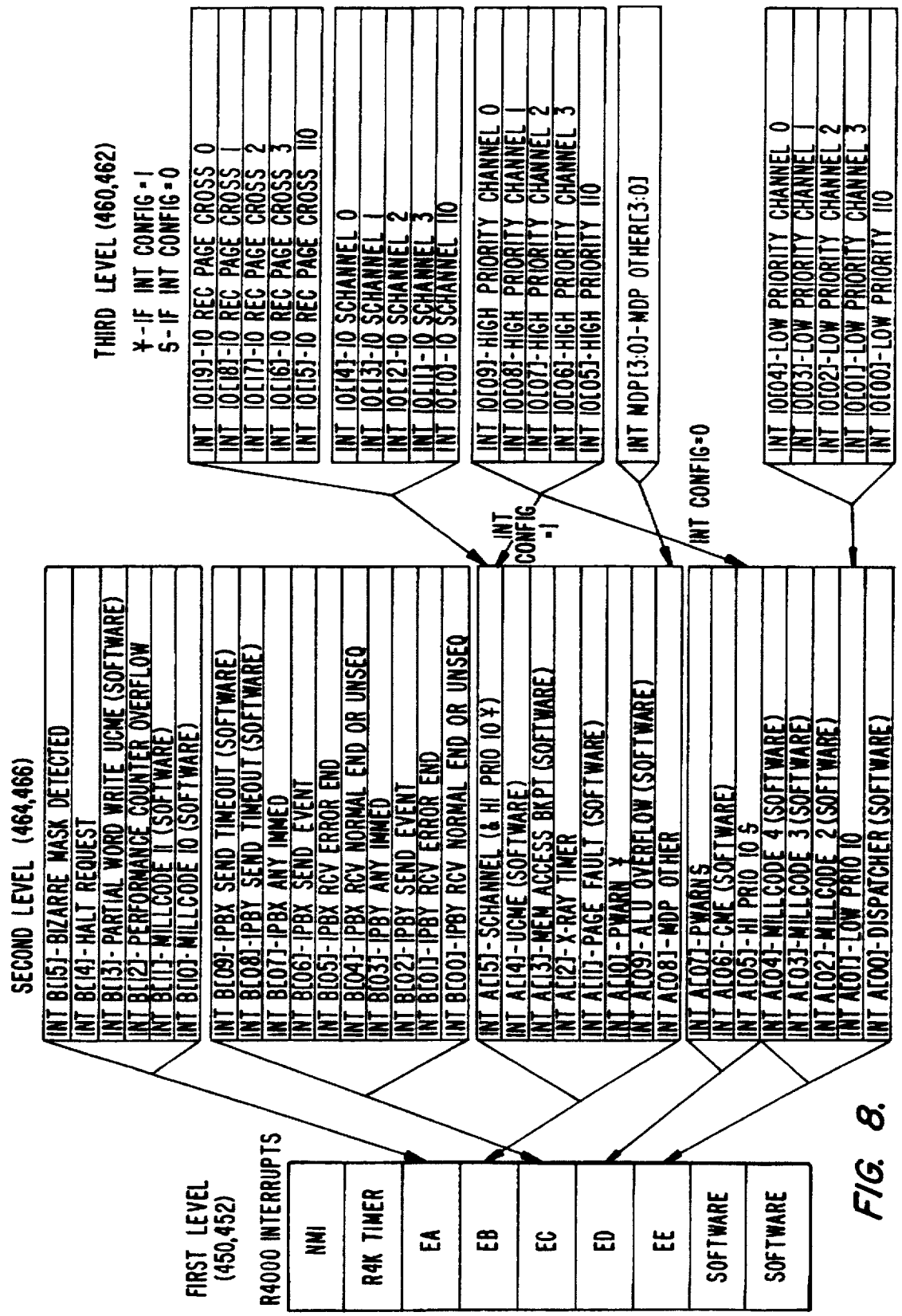
FIG. 8 shows an example of a three level interrupt hierarchy.

FIG. 8 shows registers 460, 464 in more detail. Although not shown, masks 462, 466 contain a bit for each interrupt of registers 460, 464, respectively.

Interrupts received over Ibus 26 are stored in register 460 according to their interrupt number. For some interrupts, a value is passed along with the interrupt number and this value is stored along with an indication of the setting of the interrupt, which is either in a set state or in a reset state (i.e., a cleared interrupt). These incoming interrupts are masked and prioritized according to a priority scheme, such as that shown in FIG. 8. The priority of an interrupt is determined by its interrupt number and by its priority grouping. For example, among the grouping of interrupts int_io[19:10], int_io[19] has the highest priority. Therefore, if int_io[19] and lower priority interrupts are set by incoming interrupt events over Ibus 26, only the int_io[19] interrupt will be passed on to trigger the int_a[15] interrupt at the next priority level. The number "19" might also be stored in int_a[15] so that the number of the interrupt within the priority group causing the int-a[15] interrupt can be readily determined. When int_io[19] is cleared, then the next highest priority interrupt would propagate up to int_a[15].

The mask registers contain flags for each interrupt, and if the mask bit is set, that interrupt is not sent on to the next level. Therefore, if the mask bit for int_io[19] is set, an int_io[19] interrupt would not be passed on to int_a[15] even though it is the highest priority interrupt.

Likewise, interrupts are prioritized at the second level, which reduces the interrupts to five at the first level. However, even with this narrowing of the number of different interrupts, the frequency of interrupts is not necessarily reduced, since an interrupt will often propagate all the way up to the first priority level. To reduce the amount of traffic on the Pbus for updating interrupt register 450, interrupt image register 452 maintains a copy of what should be in interrupt register 450. Interrupt image register 452 is updated by the output of mask 466 onto internal bus 490, and the pre-update contents of interrupt image register 452 are compared with the contents of internal bus 490 by comparator 470. If the contents of internal bus 490 change the contents of interrupt image register 452, then the contents of internal bus 490 are output to the Pbus, otherwise, nothing is output to the Pbus. In this way, interrupt register 450 and interrupt image register 452 are reflections of each other, except for any delay in updating interrupt register 450. Of course, if microprocessor 12 modifies interrupt register 450 internally, it should also update interrupt image register 452. The complete interrupt data need not be sent each time to microprocessor 12, since microprocessor 12, when necessary to its operation, can access the registers and masks of interrupt filter 198.

The invention has now been described. The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A boot address translation apparatus, wherein a microprocessor has an address space and requests instructions from the address space by issuing a request over a bus including an address, which is in the address space, of a desired instruction, wherein, following a microprocessor reset, the microprocessor requests a first boot instruction which is pointed to by a fixed address, and wherein the fixed address comprises a plurality of address bits, the apparatus comprising:

a boot detector, which outputs a booting signal following a microprocessor reset;

an address blocking means, responsive to said booting signal and coupled to the bus, for blocking a portion of said address bits of the fixed address;

an address substitution means, responsive to said booting signal and coupled to the bus, for substituting a substituted plurality of address bits for said blocked address bits, when the fixed address does not point to a physical address and said booting signal is asserted, said substituted plurality of address bits, when combined with unblocked address bits of the fixed address, forming a physical address in an instruction memory; and means for disabling said address substitution means after the microprocessor is configured to only make requests from valid addresses.

2. The apparatus of claim 1, wherein said address blocking means and said address substitution means comprise a multi-bit input, 2-to-1 multiplexer with a selection control input responsive to said booting signal.

3. The apparatus of claim 1, wherein addresses on the bus include parity bits meeting a parity criterium, and wherein said address substitution means further comprises means for including substituted parity bits, wherein said substituted parity bits meet said parity criterium.

* * * * *